US012765724B2

(12) United States Patent
McCann et al.

(10) Patent No.: US 12,765,724 B2
(45) Date of Patent: Oct. 20, 2026

(54) ROTATABLE TOOL VERTICAL ADJUSTMENT FOR FOOD APPLIANCE

(71) Applicant: CONAIR LLC, Stamford, CT (US)

(72) Inventors: Raymond B. McCann, Bronx, NY (US); James A. Sandor, Trumbull, CT (US)

(73) Assignee: CONAIR LLC, Stamford, CT (US)

( * ) Notice: Subject to any disclaimer, the term of this patent is extended or adjusted under 35 U.S.C. 154(b) by 706 days.

(21) Appl. No.: 18/079,094

(22) Filed: Dec. 12, 2022

(65) Prior Publication Data

US 2024/0188758 A1 Jun. 13, 2024

(51) Int. Cl.
*A47J 43/07* (2006.01)
*A47J 43/044* (2006.01)

(52) U.S. Cl.
CPC ......... *A47J 43/0711* (2013.01); *A47J 43/044* (2013.01); *A47J 2043/04472* (2013.01)

(58) Field of Classification Search
CPC .................. A47J 43/0711; A47J 43/044; A47J 2043/04472; B01F 27/07; B01F 27/071
See application file for complete search history.

(56) References Cited

U.S. PATENT DOCUMENTS

| | | | | |
|---|---|---|---|---|
| 740,751 A | 10/1903 | Friedman | | |
| 1,898,946 A * | 2/1933 | Fitzgerald | A47J 43/044 | 366/601 |
| 4,891,034 A | 1/1990 | Wilhelmsen | | |
| 5,590,962 A * | 1/1997 | Millan | A47J 43/0711 | 366/248 |
| 5,911,505 A | 6/1999 | St. John et al. | | |
| 6,908,222 B2 | 6/2005 | Brunswick et al. | | |
| 9,895,024 B2 * | 2/2018 | Pendleton | A47J 43/0711 | |
| 10,799,072 B2 | 10/2020 | Ambrose et al. | | |
| 11,358,106 B2 | 6/2022 | Branson, III et al. | | |
| 2009/0168594 A1 * | 7/2009 | Stephenson | A47J 43/0711 | 366/331 |
| 2023/0276995 A1 * | 9/2023 | Lyell | A47J 43/0722 | 83/13 |

FOREIGN PATENT DOCUMENTS

| | | |
|---|---|---|
| CN | 205458222 U | 8/2016 |
| CN | 205700350 U | 11/2016 |
| CN | 205700402 U | 11/2016 |
| CN | 210448110 U | 5/2020 |
| DE | 202022104711 U1 | 9/2022 |
| IN | 205570256 U | 9/2016 |
| JP | 2004278278 A | 10/2004 |

OTHER PUBLICATIONS

CN 210448110 machine translation, accessed via worldwide.espacenet.com (Year: 2020).*
International Search Report, Date: Nov. 6, 2023 from International Application No. PCT/US23/30214.

* cited by examiner

*Primary Examiner* — Marc C Howell
(74) *Attorney, Agent, or Firm* — Grogan, Tuccillo & Vanderleeden, LLP

(57) ABSTRACT

A tool for a food appliance includes a sleeve having an upper end configured for engagement with a drive shaft of the food processing appliance, and a lower end, and an attachment receivable on the lower end of the sleeve. A position of the attachment relative to the sleeve is adjustable.

14 Claims, 7 Drawing Sheets

ROTATABLE TOOL VERTICAL ADJUSTMENT FOR FOOD APPLIANCE

FIELD OF THE INVENTION

The present invention relates generally to food processing devices and, more particularly, to a rotatable tool for a stand mixer having a vertical adjustment mechanism.

BACKGROUND OF THE INVENTION

Stand mixers vary in size from small countertop models for home use to large capacity commercial machines. Such mixers typically food include a revolving planetary element that has a rotating beater shaft with which an attachment such as a wire whisk, dough hook or beater can be engaged, with the attachment revolving with the planetary element as well as rotating with the shaft. As the planetary element revolves and the attachment rotates, the attachment moves through food constituents in a bowl placed under the planetary element to mix, beat, or otherwise process the food constituents. Spiral-type stand mixers are similar, however, rather than creating the mixing action by rotating the attachment and/or planetary element, the bowl is rotated.

While existing stand mixers of the type described above are generally suitable for what may be regarded as ordinary performance and operation, certain operational issues may be encountered if the floor of the bowl and the bottom of the mixing attachment are not perfectly spaced. In particular, in certain cases, there may be either an undesirable gap between the bottom of the attachment and the bowl, or too much interference between the bottom of the attachment and the bowl to a degree where the attachment and bowl forcefully press into contact in a manner that may affect the operation thereof.

In view of the above, there is a need for an attachment for a food processing device, such as a stand mixer, that allows for vertical adjustment of the attachment in order to achieve an optimal spacing between the attachment and the bowl.

SUMMARY OF THE INVENTION

It is an object of the present invention to provide an attachment or tool for a food appliance.

It is another object of the present invention to provide an attachment for a food mixer such as a stand mixer.

It is another object of the present invention to provide an attachment for a stand mixer that allows for vertical adjustment of the attachment in order to achieve an optimal spacing between the attachment and the bowl.

These and other objects are achieved by the present invention.

According to an embodiment of the invention, a tool for a food appliance is provided. The tool includes a sleeve having an upper end configured for engagement with a drive shaft of the food processing appliance, and a lower end, and an attachment receivable on the lower end of the sleeve. A position of the attachment relative to the sleeve is adjustable.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
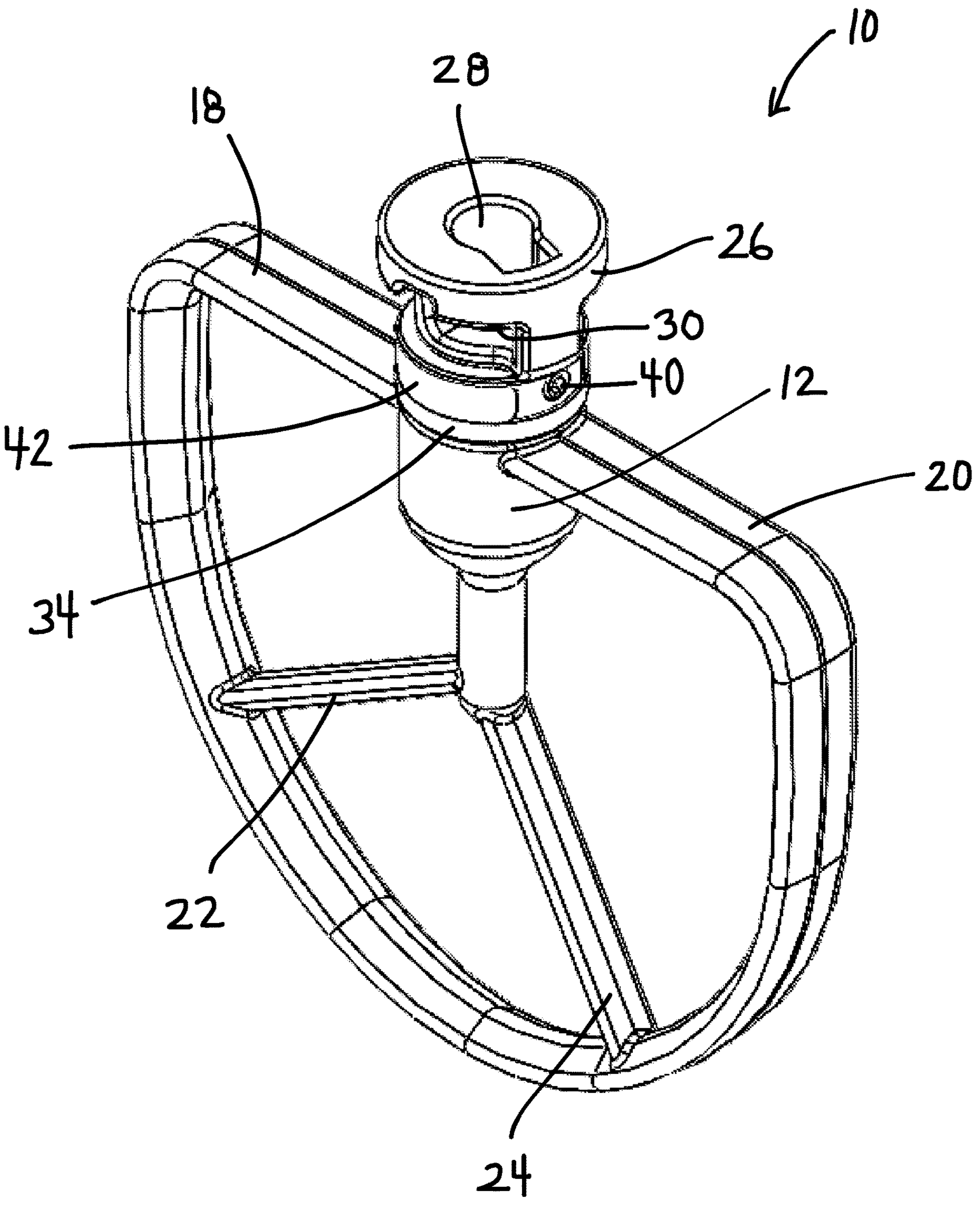
FIG. 1 is a perspective view of a tool for a food appliance according to an embodiment of the present invention.
Figure 2:
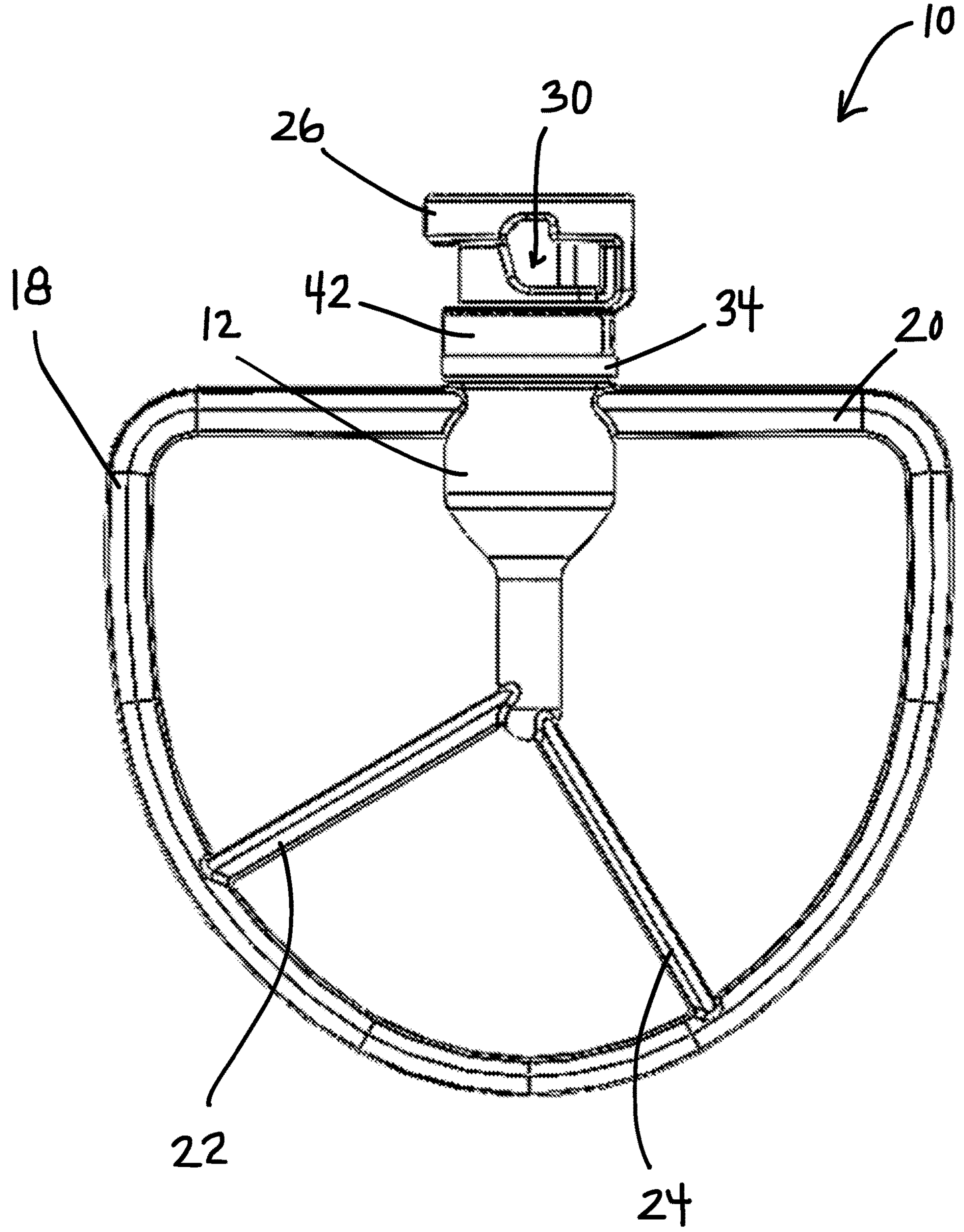
FIG. 2 is a front elevational view of the tool of FIG. 1.
Figure 3:
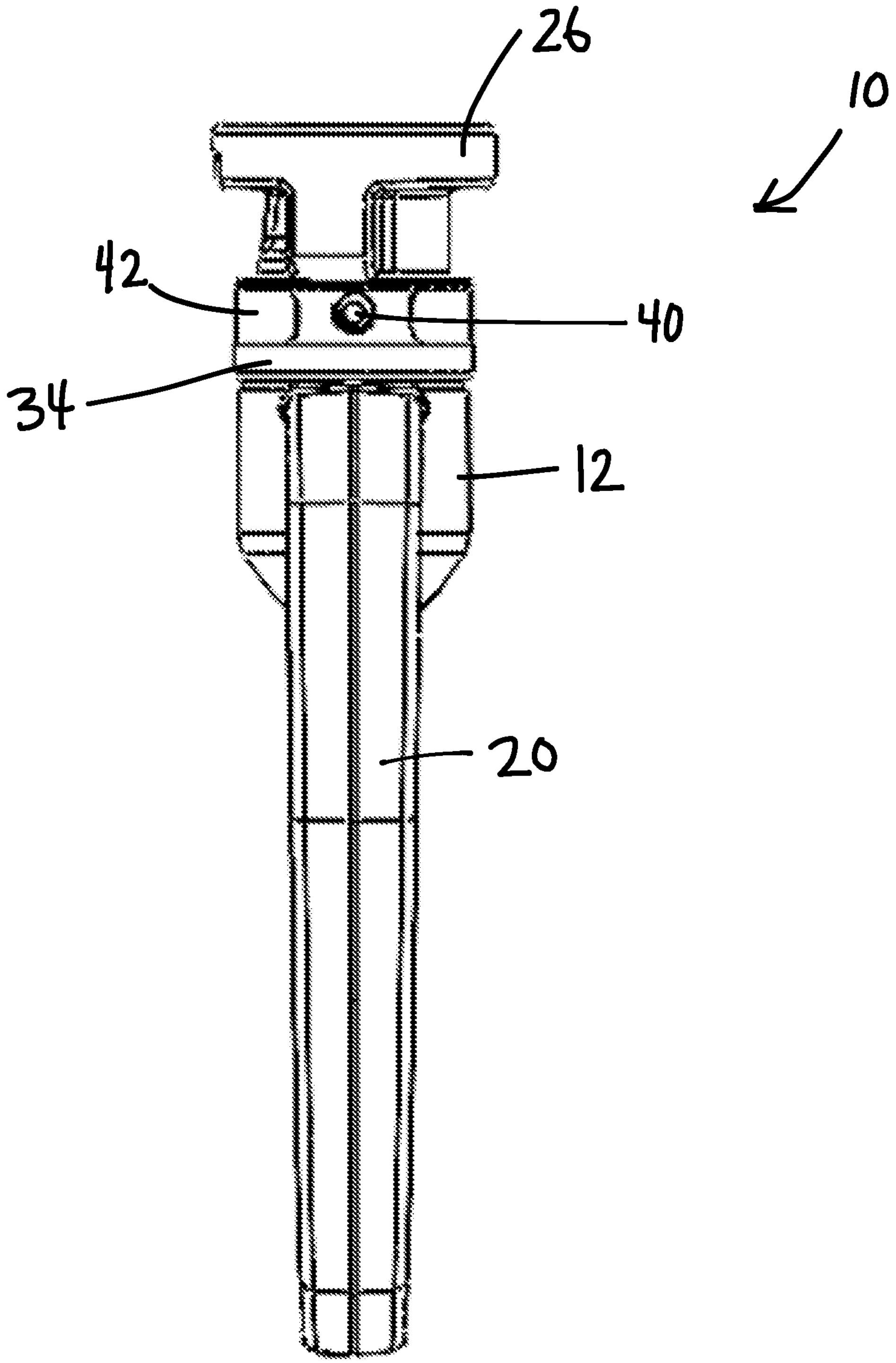
FIG. 3 is a side elevational view of the tool of FIG. 1.
Figure 4:
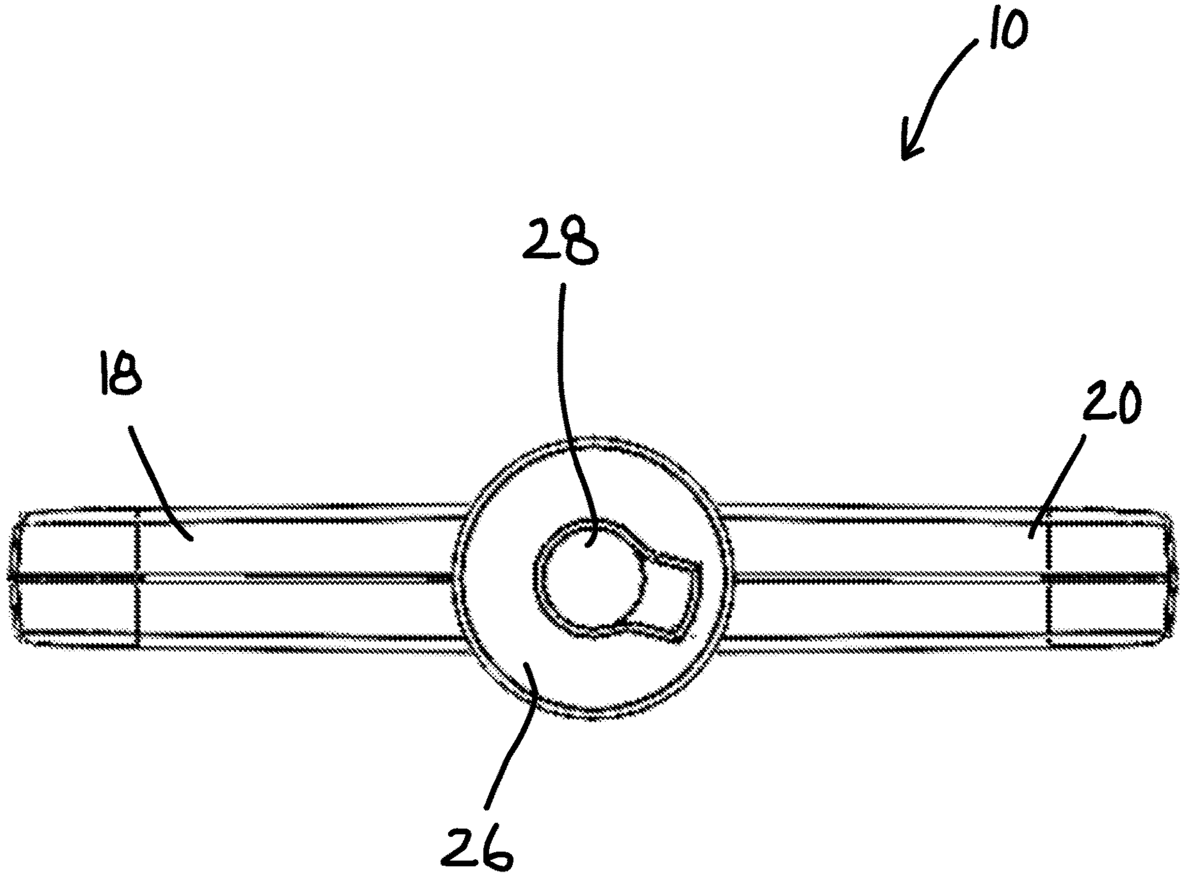
FIG. 4 is a top plan view of the tool of FIG. 1.

With reference to FIGS. 1-6, an attachment or tool 10 for a food appliance, such as a stand mixer, is illustrated. As shown therein, the tool 10 is in the form of a beater attachment, however, it is contemplated that the tool 10 may be of any type of tool or attachment known in the art for use with a stand, spiral or other mixer, such as a whisk, dough hook, spiral dough hook, scraper, or the like. As illustrated therein, the tool 10 includes a generally cylindrical hub 12 having an open upper end 14 and an internally threaded interior 16. The interior 16 has a plurality of female threads (not shown). The tool 10 further includes a pair of arms 18, 20 that extend from the hub 12 and define a generally U-shaped frame, and a pair of support ribs 22, 24 that extend between the hub 12 and lower portions of the arms 18, 20. The tool 10, including the hub 12, arms, 18, 20 and support ribs 22, 24 may formed from any material known in the art, such as aluminum, steel, plastic, or the like. In an embodiment, the hub and components formed therewith (i.e., the arms, support ribs, etc.) may together be referred to as an attachment.

Figure 5:
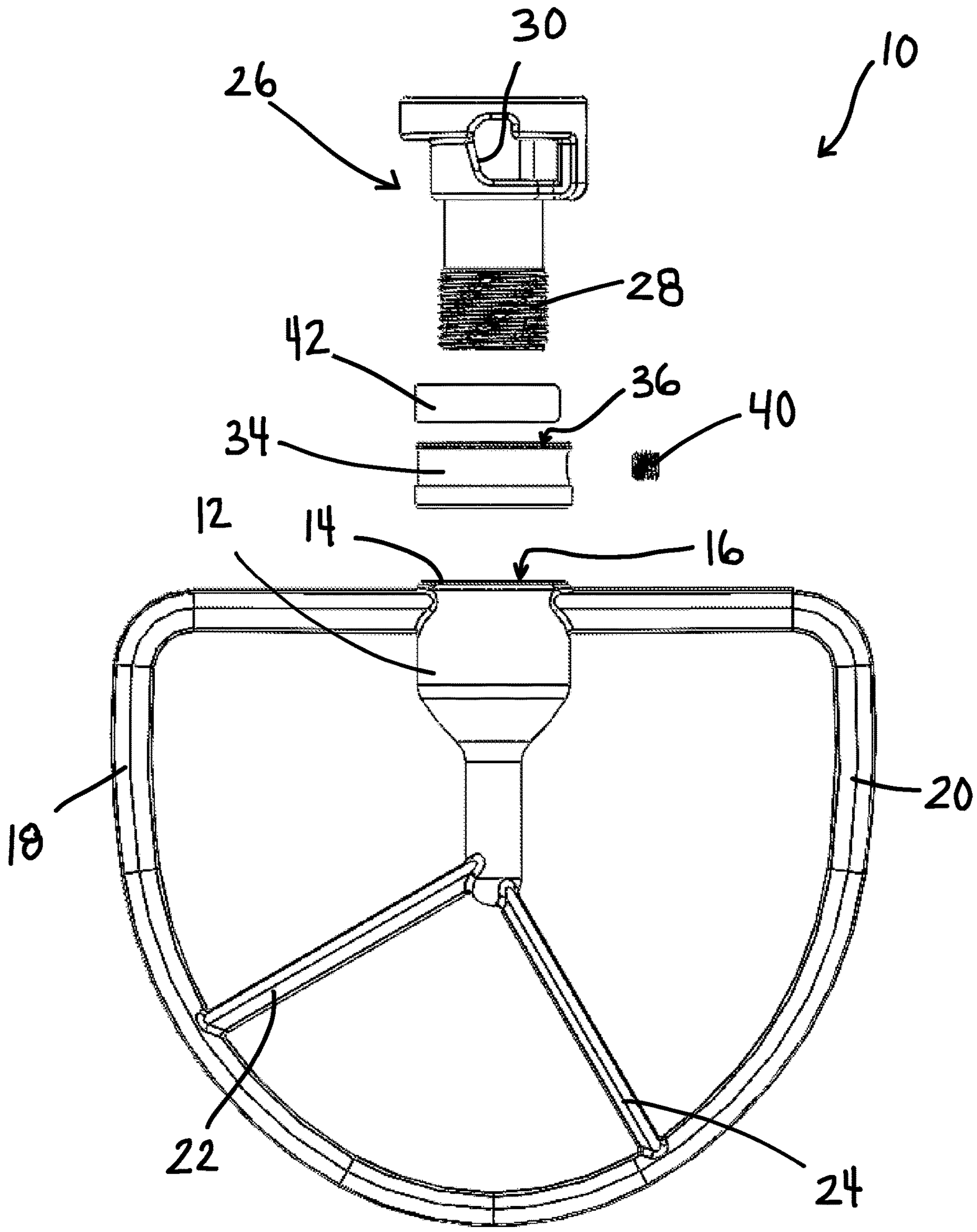
FIG. 5 is an exploded, front elevational view of the tool of FIG. 1.
Figure 6:
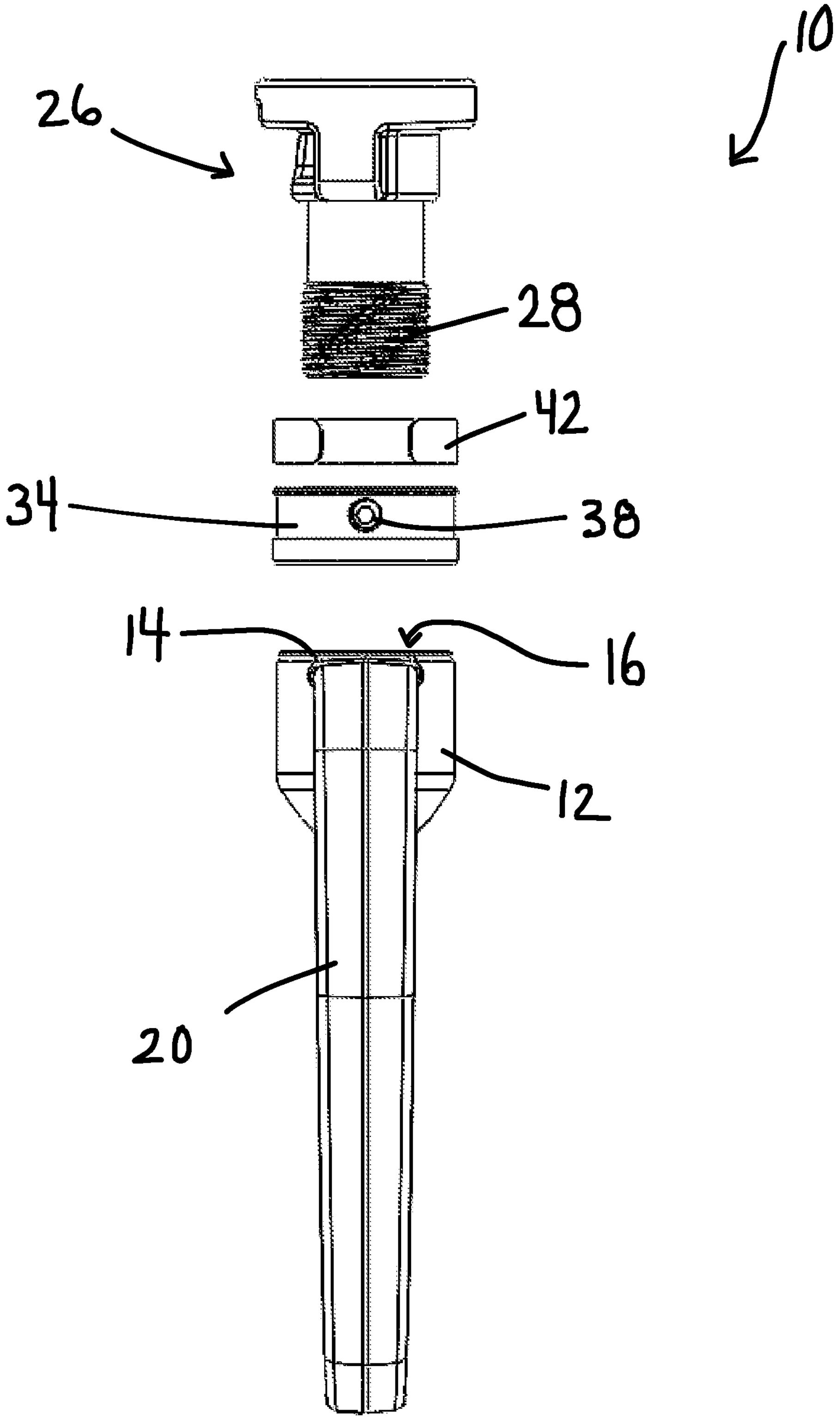
FIG. 6 is an exploded, side elevational view of the tool of FIG. 1.
Figure 7:
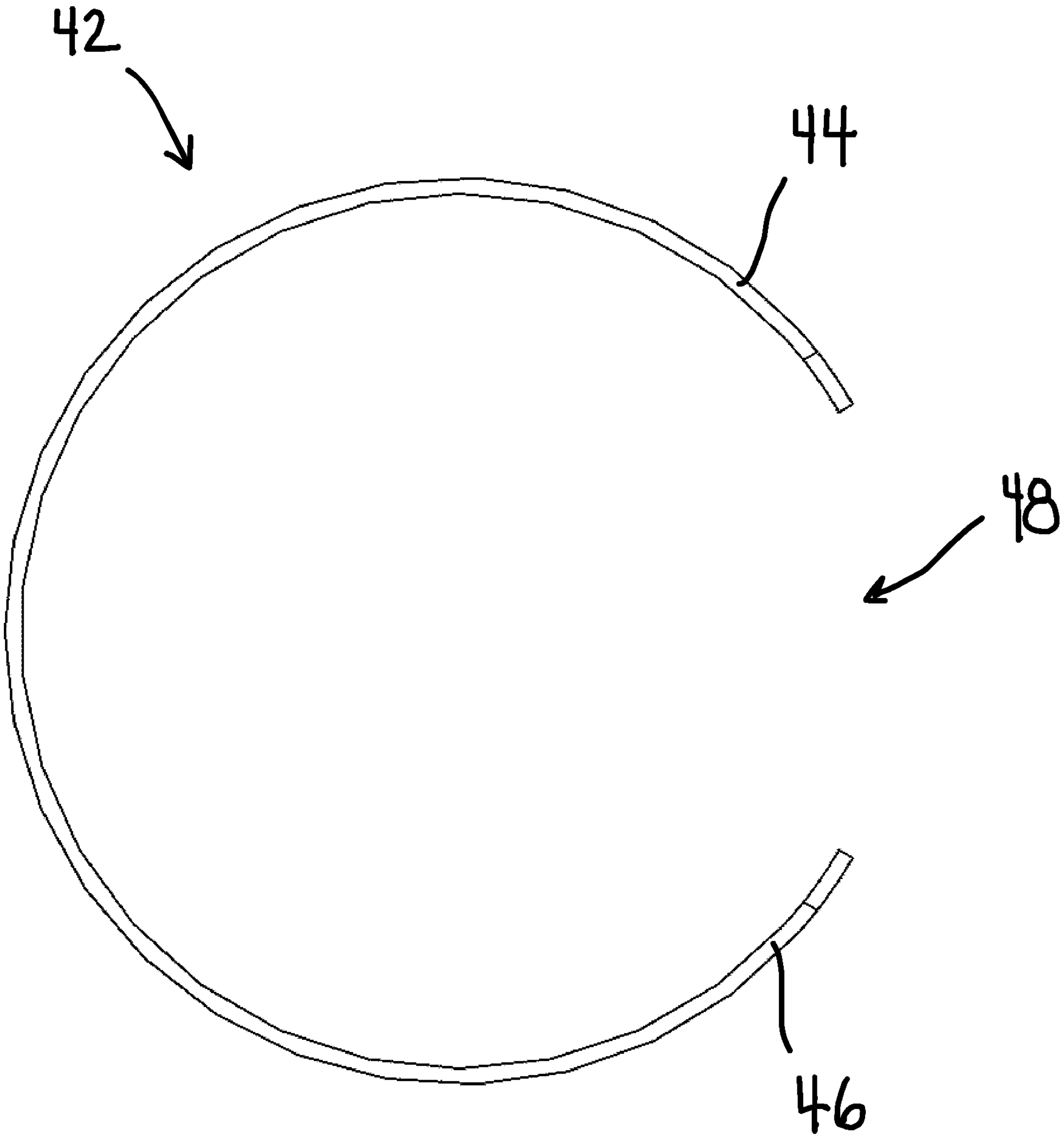
FIG. 7 is a top plan view of a C-shaped ring of the tool of FIG. 1.

As best shown in FIGS. 5 and 6, the tool 10 further includes an upper sleeve 26 that is generally cylindrical in shape and which is configured to removably engage a rotatable output shaft (not shown) of a type that is typical on stand mixers. For example, an upper end of the sleeve 26 may include an axial opening 28 for receiving the drive/output shaft of a mixer, and a lateral slot 30 configured to receive a locking pin that extends outwardly from the drive shaft, as known in the art. The lower end of the upper sleeve 26 includes a male threaded portion 32 having a plurality of male threads formed on an outer surface thereof. The male threaded portion 32 and threads thereof are sized and dimensioned to be received in the threaded interior 16 of the hub 12 such that the male threads of the male threaded portion 32 of the sleeve 26 engage the female threads within the hub 12.

As further shown therein, the tool 10 further includes a collar 34 or nut that has a female threaded interior 36 having a plurality of female threads. The collar 34 and the female threads thereof are configured to threadedly engage the male threaded portion 32 (and male threads) of the sleeve 26 in the manner discussed hereinafter. In particular, as discussed below, below the collar 34 is configured to be received on the male threaded portion 32 of the sleeve 26. Importantly, the sleeve 26 can be threaded into the collar 34 so that the lower end of the sleeve 26 extends beyond the lower end of the collar 34. The collar 34 further includes a threaded aperture 38 in the side thereof for receiving a set screw 40. Finally, the tool 10 also includes a semi-annular or C-shaped ring 42 that is configured to be received about an upper end of the collar 34, the purpose of which is described hereinafter. In an embodiment, the C-shaped ring has opposed distal arm portions 44, 46 that are resilient and which define therebetween a clearance opening 48.

In use, the collar 34 is threaded onto the male threaded portion 32 of sleeve 26, so that a distal, lower end of the male threaded portion 32 protrudes beyond the lower end of the collar 34. The upper sleeve 26 is then engaged with the drive shaft of the stand mixer. Next, the hub 12 of the frame of the tool 10 is brought into alignment with the lower end of the sleeve 26, and the hub 12 and frame are rotated to threadedly receive the hub 12 on the male threaded portion 32 of the sleeve 26 to interconnect the sleeve 26 and hub 12. Alternatively, the hub 12 and frame may be threaded onto the male threaded portion 32 of the sleeve 26 prior to coupling the sleeve 26 to the drive shaft of the mixer. In either case, in this position, the tool 10 is connected to the drive shaft of the mixer and extends downwardly into the processing bowl (not shown).

A user can look into the bowl to see the spatial relationship between the bottom of the tool 10 and the floor of the bowl. If the space between the floor of the bowl and the bottom of the tool 10 is too large, a user can rotate the hub 12 and frame in a direction to cause the hub 12 and frame to move downwardly along the male threaded portion 32 of the sleeve 26, and towards the floor of the bowl until the desired spacing therebetween is achieved. At this point, the collar 34 is rotated in the same direction, so that it advances downwardly along the male threaded portion 32 of the sleeve 26 until the lower edge thereof contacts the upper end of the hub 12. In this position, the collar 34 functions as a stop, preventing the hub 12 and frame from being advanced upwardly along the sleeve 26. Set screw 40 is then inserted into the aperture 38 in the collar 34 and rotated until the distal end thereof bears against the sidewall of the sleeve 26, preventing rotation of the collar 34 and locking it in position along the sleeve 26.

Conversely, if the space between the floor of the bowl and the bottom of the tool 10 is too small, or there is an interference between the floor of the bowl and the bottom of the tool, a user can rotate the hub 12 and frame in a direction to cause the hub 12 and frame to move upwardly along the male threaded portion 32 of the sleeve 26, and away the floor of the bowl until a desired spacing therebetween is achieved. At this point, the collar 34 is rotated in a direction sufficient to move the collar 34 downwardly along the male threaded portion 32 of the sleeve 26 until the lower edge thereof contacts the upper end of the hub 12. In this position, the collar 34 functions as a stop, preventing the hub 12 and frame from being advanced further upward along the sleeve 26. Set screw 40 is then inserted into the aperture 38 in the collar 34 and rotated until the distal end thereof bears against the sidewall of the sleeve 26, preventing rotation of the collar 34 and locking it in position along the sleeve 26.

In either case, the collar 34 functions to restrain upward movement of hub 12 and frame when the collar 34 is moved to a position where the lower edge thereof is in contact with the upper end of the hub 12. Inadvertent downward movement of the hub 12 along the male threaded portion 32 is not a concern as, in an embodiment, the direction of threads may be such that during operation, rotation of the tool 10 is in a direction that urges the hub 12 upwardly (not downwardly), and the collar 34 prevents any such further upward movement.

After the tool 10 has been adjusted so that the desired spacing between the bottom of the tool 10 and the floor of the bowl is achieved, and is locked in place in the manner described above, the C-shaped ring 42 is placed over the upper end of the collar 34 by aligning the opening 48 with the collar 34 and urging the ring 42 toward the collar to momentarily displace the arms 44, 46 and allow the ring 42 to be closely received around the collar 34. The ring 42 is then rotated so that is covers the set screw 40 and aperture 38. In this manner, the ring 42 inhibits or prevents food and debris from fouling the set screw 40 and aperture 38 during use.

The present invention therefore provides a mechanism for quickly and easily adjusting the vertical position of an attachment or tool for a stand mixer relative to a processing bowl. While the tool 10 has been described above as employing a threaded means (i.e., a threaded connection between the hub 12 and sleeve 26) that allows for vertical adjustment, it is not intended that the present invention be so limited in this regard. In particular, it is contemplated that other connection means between the hub 12 and sleeve 26 may be utilized to provide for vertical adjustability of the tool, such as for, example, a spring biased pin that is receivable in one of a series of vertically-spaced apertures corresponding to different vertical positions of the tool, a ratchet mechanism, a simple pin that is received in one of a series of vertically-spaced apertures corresponding to different vertical positions of the tool, etc.

Moreover, it is contemplated that the sleeve 26, collar 34, set screw 40 and ring 42 may, together define a universal adjustment mechanism or adapter that can be utilized with a variety of dedicated tools each having a hub configured to engage with the sleeve in the manner hereinbefore described. In this sense, the sleeve 26, collar 34, set screw 40 and ring 42 may define the adapter, and the hub 12 and components that extends therefrom (i.e., the frame) may be considered the food processing/mixing attachment or tool. In this manner, a single adapter can be purchased by a consumer, which can be utilized with a variety of attachments.

While the present invention has been described in connection with attachments or tools for stand mixers, it is not intended that the present invention be so limited in this regard. In particular, it is contemplated that the tool and adapter disclosed herein can be utilized in connection with an attachment for any type of mixing or food processing device where control over the relative position of an attachment may be desired. Lastly, as discussed above, the specific configuration of the attachment is not intended to be limited to a beater, but rather any type of attachment known in the art is contemplated.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A tool for a food appliance, comprising:

a sleeve having an upper end and a lower end, the sleeve being configured for removable engagement with a drive shaft of the food processing appliance; and an attachment receivable on the lower end of the sleeve;

wherein a position of the attachment relative to the sleeve is adjustable by rotating one of the attachment and the sleeve relative to the other of the attachment and the sleeve; and wherein the tool further includes a locking mechanism rotatably received on the sleeve, the locking mechanism configured to maintain the position of the attachment relative to the sleeve.

2. The tool of claim 1, wherein:

the lower end of the sleeve includes a threaded portion; and the attachment includes a hub having a threaded portion configured to threadedly engage the threaded portion of the sleeve;

wherein the threaded engagement between the sleeve and the attachment allows for adjustment of the attachment along the sleeve.

3. The tool of claim 2, wherein:

the attachment is one of a beater, a whisk, a dough hook and a scraper.

4. The tool of claim 1, wherein:

the attachment is removably receivable on the lower end of the sleeve.

5. The tool of claim 1, wherein:

the food processing appliance is a stand mixer.

6. The tool of claim 1, wherein:

the position of the attachment relative to the sleeve is adjustable by rotating the attachment relative to the sleeve.

7. A tool for a food appliance, comprising:

a sleeve having an upper end configured for engagement with a drive shaft of the food processing appliance, and a lower end, the lower end including a threaded portion; and an attachment receivable on the lower end of the sleeve, the attachment including a hub having a threaded portion configured to threadedly engage the threaded portion of the sleeve;

wherein a position of the attachment relative to the sleeve is adjustable;

wherein the threaded engagement between the sleeve and the attachment allows for adjustment of the attachment along the sleeve;

wherein the tool further includes a locking mechanism for locking a position of the attachment relative to the sleeve;

wherein the locking mechanism includes a collar having internal threads that are engageable with the threaded portion of the sleeve;

wherein the collar is configured to be received on the sleeve intermediate the upper end of the sleeve and the hub of the attachment; and wherein the collar is configured to contact an upper end of the hub to inhibit movement of the attachment along the sleeve.

8. The tool of claim 7, wherein:

the collar includes a threaded aperture and a set screw receivable in the threaded aperture, the set screw being configured to bear against the sleeve to lock a position of the collar along the sleeve.

9. The tool of claim 8, further comprising:

a C-shaped ring received about the collar and being selectively rotatable to cover the set screw and the threaded aperture.

10. The tool of claim 7, wherein:

the collar is annular in shape.

11. A tool for a food appliance, comprising:

a sleeve having an upper end and a lower end, the sleeve being configured for removable engagement with a drive shaft of the food processing appliance;

an attachment receivable on the lower end of the sleeve; and a locking mechanism for locking a position of the attachment relative to the sleeve;

wherein a position of the attachment relative to the sleeve is adjustable;

wherein the lower end of the sleeve includes a threaded portion;

wherein the attachment includes a hub having a threaded portion configured to threadedly engage the threaded portion of the sleeve;

wherein the threaded engagement between the sleeve and the attachment allows for adjustment of the attachment along the sleeve;

wherein the locking mechanism includes a collar having internal threads that are engageable with the threaded portion of the sleeve;

wherein the collar is configured to be received on the sleeve intermediate the upper end of the sleeve and the hub of the attachment; and wherein the collar is configured to contact an upper end of the hub to inhibit movement of the attachment along the sleeve.

12. The tool of claim 11, wherein:

the collar includes a threaded aperture and a set screw receivable in the threaded aperture, the set screw being configured to bear against the sleeve to lock a position of the collar along the sleeve.

13. The tool of claim 12, further comprising:

a C-shaped ring received about the collar and being selectively rotatable to cover the set screw and the threaded aperture.

14. The tool of claim 11, wherein:

the collar is annular in shape.

* * * * *